Aug. 4, 1931.   J. VALENTA   1,817,114

METHOD OF MAKING CONFECTION SHELLS

Filed Sept. 19, 1928

INVENTOR:—
JOSEPH VALENTA.
By Martin P. Smith ATTY.

Patented Aug. 4, 1931

1,817,114

UNITED STATES PATENT OFFICE

JOSEPH VALENTA, OF GLENDALE, CALIFORNIA

METHOD OF MAKING CONFECTION SHELLS

Application filed September 19, 1928. Serial No. 306,874.

My invention relates to a confection and the method of producing same and has for its principal object, to produce, by a relatively simple and easily practiced method, edible shells or cases which, when filled with ice cream, custard or the like, provide an attractive and tasty food product.

A further object of my invention is, to provide a method of producing confection shells or cases, wherein certain ingredients are combined and treated so that the produced shells or cases, are of hollow box-like structure, composed only of the outer walls and wholly devoid of internal webs, partitions or cells.

A still further object of my invention is, to utilize in the production of the shells or cases, ingredients that will readily combine with the filling of ice cream, custard or the like, in forming a pleasing, wholesome and palatable confection.

In the drawings—

Figure 1:
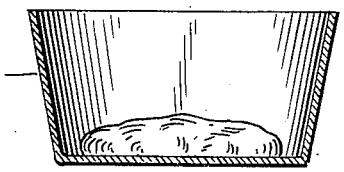
Fig. 1 is a sectional view of a pan or form that may be used in the production of the shell or case by my improved method and showing a body of the mixed ingredients within said pan or form, as it appears before the baking operation.
Figure 2:
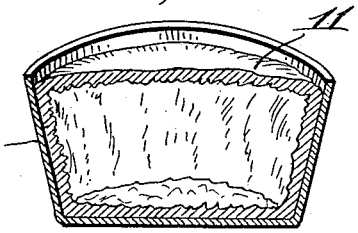
Fig. 2 is a cross section in perspective and showing the shell or case in the pan or form after baking.
Figure 3:
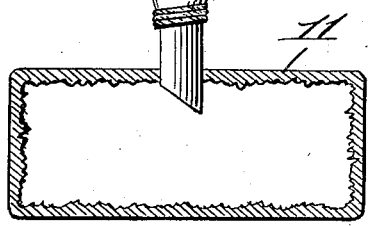
Fig. 3 is a cross section of a completed shell or case and showing the means employed for filling the same with edible substance such as ice cream or custard.
Figure 4:
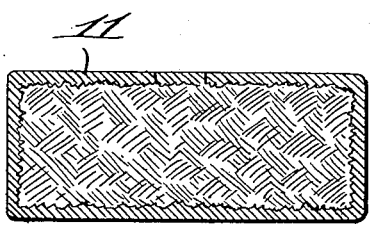
Fig. 4 is a cross section of the shell or case after the filling has been placed therein and showing the confection ready to be served.

In the production of the shells or cases, by my improved method, sugar and eggs, or in some instance, the yolks of eggs only, are mixed and thoroughly beaten while cold.

In producing this mixture, the sugar and eggs are combined at the ratio of four whole eggs to each half pound of sugar, or if only the yolks of the eggs are used, then ten yolks are combined with each half pound of sugar.

After the mixture has been thoroughly beaten, a relatively small quantity of leavening substance, for instance, baking powder or carbonate of ammonia, is added and thoroughly beaten into said mixture while cold. A small quantity of the mixture is now dropped into a pan or form 10 and under the application of heat by baking methods, the mixture will expand against the walls of the pan or form and produce a hollow box-like shell or case 11, the space or chamber within which is wholly devoid of webs, walls or partitions.

That portion of the external surface of the shell when baked is relatively smooth and is of the nature of a brittle crust while the inner surface of the wall of the shell is comparatively rough and more or less viscous or gummy in nature, thereby enabling the case to be chewed when eaten.

The use of the whites and yolks of eggs in the mixture tends to increase the viscosity of the inner surfaces of the shells and the use of the egg yolks only renders the inner surfaces less viscous and increases brittleness.

After the shells have been formed by baking, comparatively small apertures are formed in the walls thereof and with a suitable implement, for instance, a cream puff filler, the chambers within the shells are filled with a suitable edible substance such as ice cream, custard, whipped cream, jelly or the like. After being thus filled, the confection is ready to be served.

In some instances it may be found advantageous to fill the shells with ice cream custard and then freeze the latter, thus producing a coated or encased body of ice cream.

The shells or cases may be produced in various sizes and shapes and, by adding fruit extracts, chocolate, cinnamon or the like, to the mixture of eggs and sugar, the shells may be produced with different pleasing colors and flavors.

By dropping small quantities of the mixture of eggs and sugar onto the flat surface of a pan or the like, and then subjecting same to baking heat, small hollow cake or cookie-like members may be produced.

Thus it will be seen that I have provided a relatively simple and easily practiced method of producing edible hollow shells or cases that are especially adapted for use in the making of wholesome palatable confections and which shells are formed with open chambers, entirely devoid of webs, partitions and the like, and the inner surfaces of the walls of the shells being more or less gummy or viscous in nature, thereby enabling the confection to be chewed when eaten.

I claim as my invention:

1. The herein described method of producing hollow confection shells which consists in mixing eggs, sugar and a leavening substance and then baking the mixture to form a shell having viscous inner surfaces and a brittle crust-like outer surface and said shell when baked having an open unobstructed chamber.

2. The herein described method of producing a confection which consists in mixing eggs, sugar and a leavening substance, then baking the mixture to produce a hollow shell having viscous inner surfaces and a brittle crust-like outer surface, said shell when baked having an open unobstructed chamber and then filling said chamber with an edible substance.

3. The herein described method of producing a confection which consists in mixing sugar, eggs and a leavening substance, then baking said mixture to form a hollow shell having viscous inner surfaces and a brittle crust-like outer surface, the chamber within which shell is open and unobstructed then forming an opening in said shell and then filling the open unobstructed chamber with an edible substance.

In testimony whereof I affix my signature.

JOSEPH VALENTA.